(12) United States Patent
Guim et al.

(10) Patent No.: US 10,037,288 B2
(45) Date of Patent: Jul. 31, 2018

(54) MEMORY PROTECTION AT A THREAD LEVEL FOR A MEMORY PROTECTION KEY ARCHITECTURE

(71) Applicant: Intel Corporation, Santa Clara, CA (US)

(72) Inventors: Francesc Bernat Guim, Barcelona (ES); David A. Koufaty, Portland, OR (US); Andrea Pellegrini, Hillsboro, OR (US); Rajesh M. Sankaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/088,836

(22) Filed: Apr. 1, 2016

(65) Prior Publication Data
US 2017/0286326 A1    Oct. 5, 2017

(51) Int. Cl.
*G06F 12/00*    (2006.01)
*G06F 12/14*    (2006.01)
(Continued)

(52) U.S. Cl.
CPC ...... *G06F 12/1475* (2013.01); *G06F 12/1009* (2013.01); *G06F 21/6209* (2013.01);
(Continued)

(58) Field of Classification Search
CPC .. G06F 12/1475; G06F 12/1009; G06F 21/62; G06F 2212/152; G06F 2212/657
See application file for complete search history.

(56) References Cited

U.S. PATENT DOCUMENTS 5,845,129 A * 12/1998 Wendorf .......... G06F 12/1491
                                                    710/200
5,890,189 A *  3/1999 Nozue ............... G06F 12/109
                                                    711/100
(Continued)

FOREIGN PATENT DOCUMENTS

WO    2014201162 A1    12/2004

OTHER PUBLICATIONS

PCT Notification of Transmittal of the International Search Report and The Written Opinion of the International Searching Authority for PCT Application No. PCT/US2017/020500, 15 pages, dated Jun. 8, 2017.

*Primary Examiner* — Mark A Giardino, Jr.
(74) *Attorney, Agent, or Firm* — Lowenstein Sandler LLP

(57) ABSTRACT

A processing system includes a processing core to execute a task and an input output (IO) memory management unit, coupled to the core. The IO memory management unit includes a storage unit to store a page table entry including an identifier of a memory domain and a protection key associated with the identifier. The protection key indicates whether a memory page in the memory domain is accessible. The IO memory management unit also includes a protection key register comprising a field indexed by the protection key, the field including a set of bits reflecting a memory access permission associated with the protection key. The protection key register is, responsive to receiving a request from an IO device to store data associated with the process or the thread of the process, to one of allow or deny permission to access the memory page in the memory domain for storage of the data associated with the process or the thread of the process based on the protection key.

24 Claims, 13 Drawing Sheets

(51) Int. Cl.
*G06F 12/1009* (2016.01)
*G06F 21/62* (2013.01)
G06F 13/00 (2006.01)
G06F 13/28 (2006.01)

(52) U.S. Cl.
CPC ............... *G06F 2212/1052* (2013.01); *G06F 2212/152* (2013.01); *G06F 2212/657* (2013.01)

(56) References Cited

U.S. PATENT DOCUMENTS

| | | |
|---|---|---|
| 2003/0101322 A1 | 5/2003 | Gardner |
| 2006/0036830 A1 | 2/2006 | De Dinechin et al. |
| 2006/0041733 A1 | 2/2006 | Hyser |
| 2009/0037782 A1* | 2/2009 | Hughes ............... G11C 29/024 714/53 |
| 2011/0023027 A1* | 1/2011 | Kegel ..................... G06F 12/10 718/1 |
| 2013/0160114 A1 | 6/2013 | Greenwood et al. |
| 2014/0068232 A1* | 3/2014 | Wang .................... G06F 9/3851 712/225 |
| 2016/0350019 A1* | 12/2016 | Koufaty ............... G06F 3/0622 |
| 2016/0371139 A1* | 12/2016 | Stark ................... G06F 11/0787 |
| 2017/0132011 A1* | 5/2017 | Caulfield ............. G06F 9/3867 |

* cited by examiner

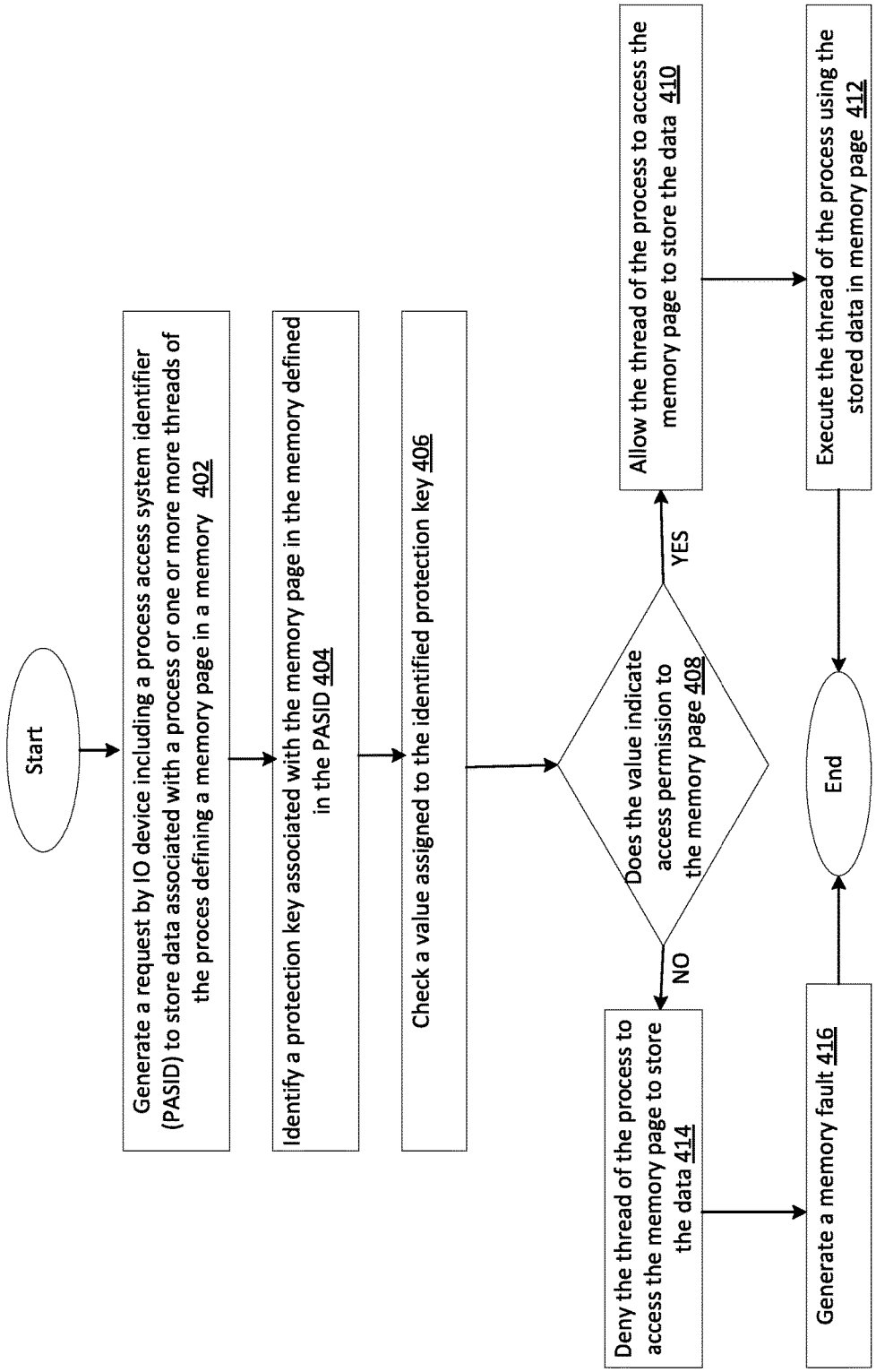

MEMORY PROTECTION AT A THREAD LEVEL FOR A MEMORY PROTECTION KEY ARCHITECTURE

TECHNICAL FIELD

The implementations of the disclosure relate generally to a computing device, and, more specifically, relate to memory protection at a thread level for a memory protection key architecture.

BACKGROUND

A computing device may include one or more processing cores in one or more processors (such as central processing units (CPUs)) for executing instructions and a memory device (such as random-access memory (RAM)) for storing instructions and data associated with executing tasks (including user application and system application such as the kernel of an operating system) on the one or more processing cores. Instructions of each application program address the memory using virtual addresses (or linear addresses) of a virtual memory, which may be translated into physical addresses of the memory by a memory management unit (MMU) associated with the one or more processors.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 4 is a flow diagram illustrating operations of an input memory management unit for providing memory protection at a thread level for a memory protection key architecture according to an implementation of the present disclosure.

DETAILED DESCRIPTION

Figure 1:
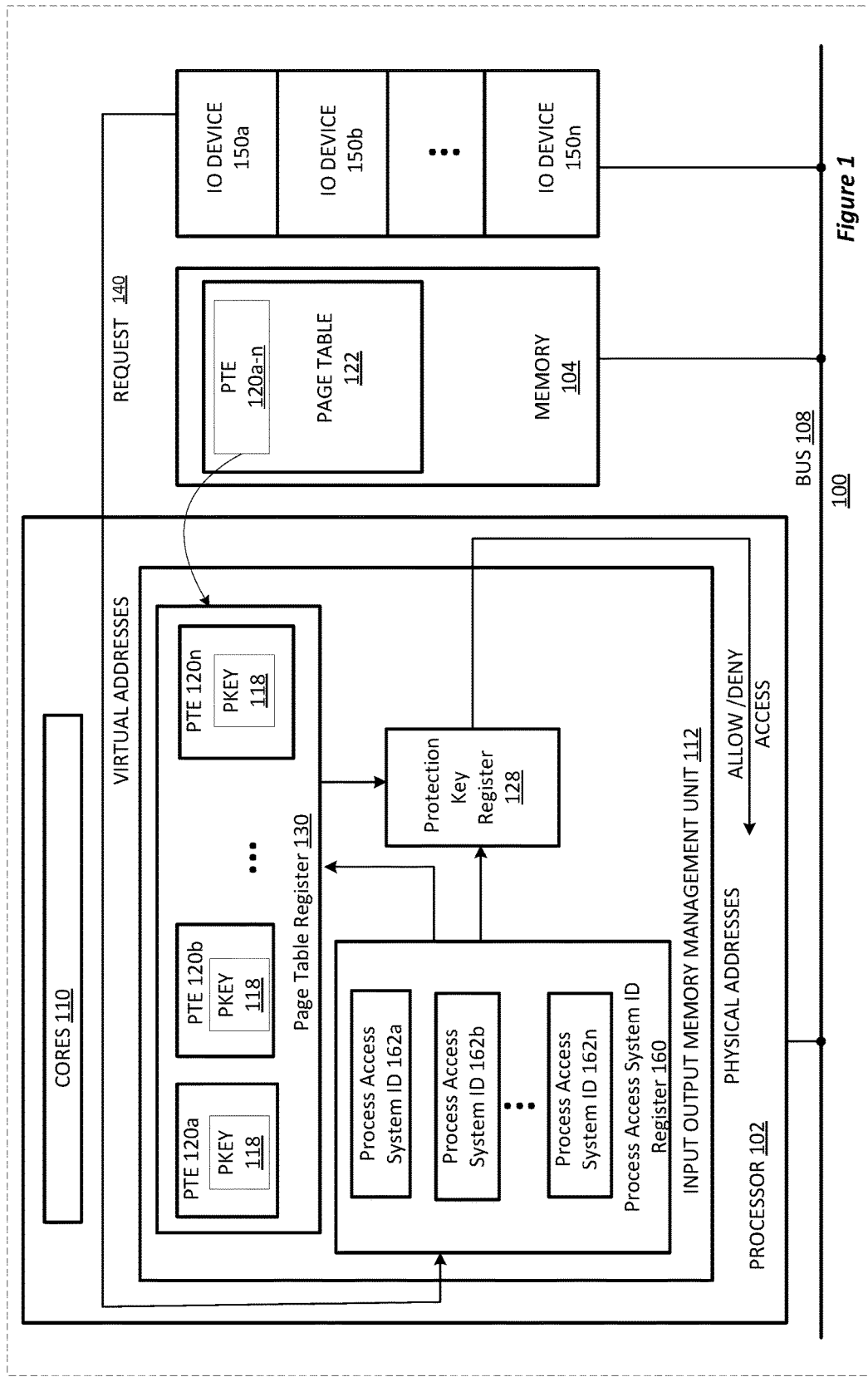
FIG. 1 illustrates a system on chip (SoC) including a processing system for memory protection at a thread level according to an implementation of the present disclosure.

An application program may be associated with a privilege level that determines its access mode (e.g., as a user or as a supervisor) to memory. For example, a user application may have a low privilege of a user-mode, and a system application (such as the kernel) may have a high privilege of a supervisor-mode. A task of the application program executed on a processing core may need to access (read, write or execute) memory referenced by virtual addresses, which may be translated into physical addresses of the memory by a memory management unit.

A page table entry is an item of a page table that is used to map virtual addresses to physical addresses of the memory. The page table entry may include a field to store a type of page referenced by the page table entry. For example, a set bit ("1") indicates a user page, while a cleared bit ("0") indicates a supervisor page. The memory pages whose page table entry indicates a user page type may be accessed by tasks running at any privilege level (including user applications having a user-mode access and system applications having a supervisor-mode access), while memory pages whose page table entry indicates a supervisor page type are restricted to tasks running at the privilege level higher than the user level. In one implementation, an operating system may assign a portion of the memory as supervisor pages reserved for the kernel of the operating system. The operating system may also assign a portion of the memory to user pages for use by user application programs. In certain implementations, each page table entry in a page table is tagged with an n-bit protection key without distinguishing whether a page table entry is created for user pages or for supervisor pages.

A protection key architecture provides number domains, which are used to tag a memory page of a process. The protection key architecture includes a protection key register, which contains attributes such as memory access permissions to protect memory accesses between threads of processes. When memory is accessed, in addition to a permission check associated with the page table as discussed above, the protection key also requires that the domain associated with the memory page (page) have granted the memory access permission associated with the type of memory access permission. For example, store data permission requires that the domain of the page where the address resides is to have store permission.

Current protection key architectures provide protection to the memory at a process level. However, with an increasing number of threads per process, and increasing number of system resources (such as external devices) accessing the memory, often result in attempts to access the memory pages to which they have not been granted the permission. Such accesses may be considered a malicious access to the memory and may potentially corrupt the memory. For example, a first thread of a process could be programmed by a user of an external device to access a memory page that may be reserved for a second thread However, when the first thread accesses this memory page, memory corruption and a security violation may occur.

Implementations of the disclosure alleviate the above noted and other deficiencies by implementing a protection key architecture that provides memory protection from external devices at a thread level. Implementations of the present disclosure provide an input output (IO) memory management unit, which includes a protection key register having a plurality of fields, each field including a set of bits reflecting memory access permission associated with a protection key, which indicates whether a memory page in a memory domain is accessible. A memory domain is a region in a memory that includes a memory page utilized to store data associated with a process or a thread of a process. The protection key register is, responsive to receiving a request from an IO device to store data associated with a thread among a plurality of threads of a process, to one of allow or deny permission to access the memory page in a memory domain for storing of data on behalf of the thread of the process based on the protection key. In one implementation, the IO memory management unit is provided at the processor. In another implementation, the IO memory management unit is provided at the IO device.

FIG. 1 illustrates a system-on-a-chip (SoC) 100 including a processing system to protect memory according an implementation of the present disclosure. The SoC 100 may include a processor (such as a central processing unit (CPU)) 102, a memory 104 and input output devices ("IO devices") 150*a-n* that are connected to each other via a bus system 108. The processor 102 may execute tasks for system applications and user applications using the memory 104 to store the instructions and data associated with programs for executing the tasks for the system applications and user applications. Each of the IO devices 150*a-n* may access certain portions of the memory 104 via one or more application threads, which are utilized by the processor 102 to execute the tasks.

In one implementation, the processor 102 may further include one or more processing cores 110 and an input output memory management unit (IOMMU) 112. The one or more processing cores 110 are the engines within the processor 102 for executing the tasks. In one implementation, the tasks executed on processing cores 110 do not access the memory 104 directly using the physical addresses of the memory. Instead, the tasks access a virtual memory through virtual addresses (also known as linear addresses). The IOMMU 112, communicably coupled to the processing cores 110 and the memory, may map the virtual addresses of the virtual memory to the physical addresses of the memory 104. The space of virtual addresses may be divided into fixed-sized units called pages. A page of the virtual addresses may be mapped correspondingly into fixed-sized units in the space of the physical addresses of the memory 104 called memory frames.

In one implementation, the memory 104 may include a virtual address page table 122 for storing mappings between pages of virtual addresses to physical addresses. The mappings may be the association between identifiers of pages (or page numbers) to identifiers of memory frames (or memory frame numbers). The memory frame numbers determine the region of the memory 104 allocated to a task.

In one implementation, the virtual address page table 122 may include a plurality of page table entries (PTEs) 120*a*-120*n*. The page table entries are also known as leaf nodes of the page table. In one implementation, each of the page table entries 120*a*-120*n* of the virtual address page table 122 may be loaded into a page table register 130 of the IOMMU 112 so that the IOMMU 112 may perform memory address mapping. Each of the page table entries 120*a*-120*n* may store one or more memory frame numbers that are identified according to virtual address page numbers. In one implementation, a task executing on the processing cores 110 may allocate a block of memory by specifying one or more virtual address ranges. A virtual address may include a first portion including one or more bits (e.g., the high-order twenty bits) indicating the virtual address page number and a second portion of bits (e.g., the lower-order 12 bits) indicating the byte offset within a memory frame corresponding to the page. The IOMMU 112 may use the virtual address page number to identify a memory frame number stored in each of the page table entries 120*a*-120*n*, and combine the identified memory frame number and the offset byte to form a physical address for accessing the memory 104. The physical address corresponding to the virtual address may be stored in a buffer.

In one implementation, each of the page table entries 120*a*-120*n* in the page table register 130 of IOMMU 112 may further include a protection key section 118 to store a protection key selected by the operating system for the page table entry 120. In one implementation, the operating system may select the protection key from a set of existing protection keys available to the operating system. For example, there may be sixteen protection keys available for the operating system to select, and the operating system may select one that is designated as the default protection key by the operating system or one protection key that is selected by an application. In one implementation, a protection key is a string of binary bits (e.g., 4 bits) that is used as an identifier to retrieve a set of memory access permissions stored in one or more permission registers.

In one implementation, the IOMMU 112 includes a protection key register 128. In one implementation, the protection key register 128 is a register including a number of fields each storing a set of memory access permissions for a set of pages. In one implementation, the protection key 118 may identify a particular permission stored in the protection key register 128. For example, the protection key 118 may be an index to the field that stores a set of permissions of the protection key register 128. Therefore, each set of permissions stored in the protection key register 128 may be uniquely retrieved according to the protection key 118 and a user or supervisor memory access mode (not shown) in the page table entries 120*a*-120*n*.

In one implementation, each field of the protection key register 128 may store a set of permissions including a number of memory access permission bits. In one implementation, the set of permissions may include a first bit to indicate whether read access is enabled or disabled, a second bit to indicate whether write access is enabled or disabled, and a third bit to indicate whether execution access is enabled or disabled. In one implementation, the permission may also include bits indicating permissions for encrypting the memory frames stored in the page table entry 120 and other defined attributes.

In one implementation, the IOMMU 112 includes a process access system identifier (ID) register 160. The process access system ID register 160 includes a plurality of a process access space identifiers (PASIDs) 162*a*-162*n* each corresponding to an IO device 150*a*-150*n*. Each PASID can be a process tag that identifies a process or one or more threads of the process requested by the corresponding IO device 150*a*-150*n*. Each of the PASIDs 162*a*-162*n* identifies an address/page corresponding to a region in the memory 104 to access in order to store data associated with a process or one or more threads of the process. Each of the PASIDs 162*a*-162*n* is unique to a memory page/pages residing in the memory domain. Specifically, each of the PASIDs 162a-162n defines the page table entry (PTE) 120a-120n in the page table register 130 for each of the threads of the process. In one implementation, each of the PTEs 120a-120n in the page table register 130 is identified based on a page provided in the PASIDs 162a-162n to store data on behalf of the process or the one or more threads of the process.

In one implementation, the protection key 118 associates each of the memory pages being utilized for storing of data for execution with one or more memory domains (domains). As discussed above, a memory domain is a region in a memory that includes a memory page utilized to store data on behalf of a process or a thread of a process. In one implementation, upon receipt of a request to store data on behalf of a process one or more threads of a process, the PASID is utilized to look up the protection key 118 for the memory page in the page table 122.

In one implementation, a value is assigned to the bits of each of the protection keys 118 in the page table entries 120a-120n in order to determine whether the one or more threads of a process are allowed access to the page residing in the memory domain. For example, the operating system may set bits in protection key 118 to allow access to the page in the memory domain. In one implementation, the bit of the protection key having a value of 1 indicates that the one or more threads of the process can access the page in the memory domain. In one implementation, the bit of the protection key having a value of 0 indicates that the one or more threads of the process cannot access the page in the memory domain.

In one implementation, the IOMMU 112 receives a request from an IO device 150a-150n to store data on behalf of a process or one or more threads of a process in a page/address in the memory 104 identified by a PASID 162a-162n. In one implementation, upon receipt of the request 140, the page in the corresponding PASID 162a-162n is retrieved to identify one of the PTEs 120a-120n in the page table register 130 for each thread of the process. Upon identification of a PTE in the PTEs 120a 120n, a protection key 118 associated with the identified PTE in the PTEs 120a-120n is identified. As discussed above, the protection key 118 identifies a particular permission stored in the protection key register 128.

In one implementation, the IOMMU 112 may include logic to determine whether the IO device 150a-150n has permission to access the page in the memory 104 in order to store the data associated with the processor the one or more threads of the process identified in the PASID 162a-162n. Specifically, the protection key register 128 determines whether the one or more threads of the process in the PASID 162a-162n whose identifiers are stored in the page table entry 120a-120n has permission to access the memory frames. In one implementation, the value of the protection key 118 assigned to the page table entry 120a-120n is checked. As discussed above, the value of the protection key 118 determines whether the one or more threads of a process are allowed access to the page residing in the memory domain. Accordingly, based on the value assigned to the protection key 118, the protection key register 128 determines whether the one or more threads of the process identified in the PASID 162a-162n is allowed or denied access to the page in the PTE 120a-120n.

In one implementation, when the protection key register 128 determines that the one or more threads of the process have permission to access the page, the protection key register 128 allows access to the memory page to store the data associated with the process or the one or more threads of the process. In one implementation, upon storage of the data in the memory page, the one or more threads of the process are executed by the processing core 110 using the stored data. In one implementation, when the protection key register 128 determines that the one or more threads do not have permission to access the memory frame, the protection key register 128 denies access to the memory page to store the data associated with the process or the one or more threads of the process. In one implementation, the protection key register 128 generates a memory fault signal upon determining that the one or more threads do not have permission to access the memory page. The memory fault signal may include the PASID 162a-162n identifying a memory address of the memory page, which was denied access for storage of the data. The memory fault signal may include the PASID 162a-162n identifying the process or the thread of the process, which failed upon denial of permission to access the memory page.

Figure 2:
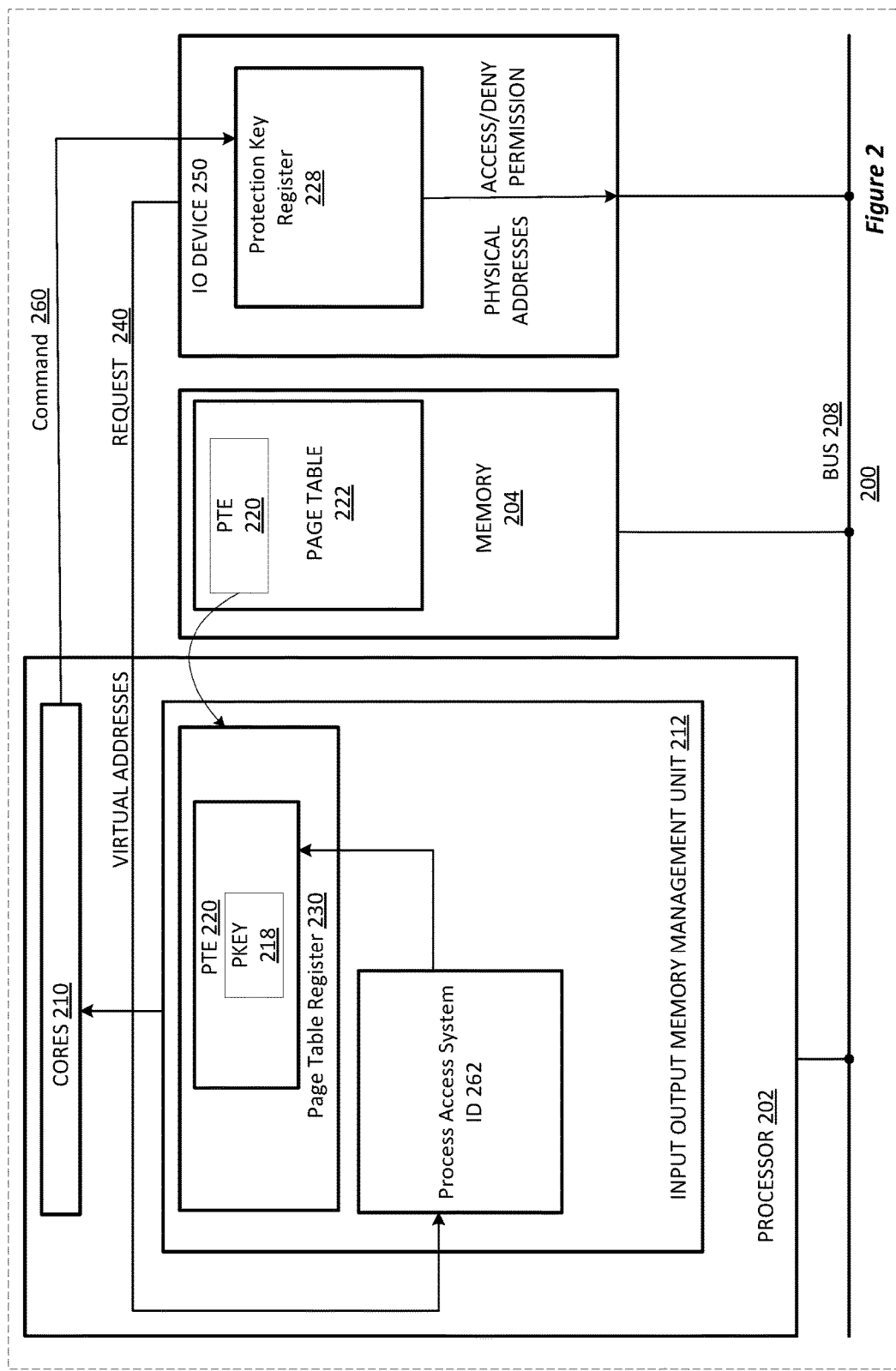
FIG. 2 illustrates a system on chip (SoC) including a processing system for memory protection at a thread level according to another implementation of the present disclosure.

FIG. 2 illustrates a block diagram of a SoC 200 including a processing system to protect memory according an implementation of the present disclosure. The SoC 200 may include a processor (such as a CPU) 202, a memory 204, and an IO device 250 that are communicably coupled to each other via a bus system 208. In one implementation, the processor 202 is same as the processor 102 of FIG. 1, the memory 204 is same as the memory 104 of FIG. 1, and the IO device 250 is same as the IO device 150 of FIG. 1. In one implementation, the processor 202 may further include one or more processing cores 210 (which may be the same as processing cores 110 of FIG. 1) and an IOMMU 212 (which may be the same as the IOMMU 112 of FIG. 1). In one implementation, the memory 204 may include a virtual address page table 222 (which may be the same as the virtual address page table 122 of FIG. 1) for storing mappings between pages of virtual addresses to physical addresses.

In one implementation, the virtual address page table 222 may include a plurality of page table entries 220, each of which may be the same as the page table entry 120 of FIG. 1. In one implementation, a page table entry 220 of the virtual address page table 222 may be loaded into a page table register 230 (which may be the same as the page table register 130 of FIG. 1) of the IOMMU 212. The IOMMU 212 may then utilize the loaded page table entry 220 of the page table register 230 to perform the memory address mapping. In one implementation, the page table entry may further include a protection key section 218 to store a protection key selected by the operating system for the page table entry 220. In one implementation, the protection key section 218 is the same as the protection key 118 of FIG. 1. As discussed above, a protection key is a string of binary bits (e.g., 4 bits) that may be used as an identifier to retrieve a set of memory access permissions stored in one or more permission registers.

In one implementation, the device 250 includes a protection key register 228. The protection key register 228 may be the same as the protection key register 128 of FIG. 1. In one implementation, the IOMMU 212 includes a PASID 262 corresponding to the IO device 250. The PASID 262 may be the same as the PASID 162 of FIG. 1. As discussed above, the PASID 262 identifies an address/page corresponding to the region in the memory 204 to access in order to store data associated with the processor one or more threads of the process. The PASID 262 is unique to a memory page residing in the memory domain. Specifically, the PASID 262 defines the PTE 220 in the page table register 230 for a thread of the process. In one implementation, the PTE 220 in the page table register 230 is identified based on a memory page provided by the process in the PASID 262.

In one implementation, the IMMOU 212 receives a request 240 from the IO device 250 to store data associated with a process or one or more threads of the process utilizing a page/address in the memory 204 identified by the PASID 262. In one implementation, upon receipt of the request 240, the page in the PASID 262 is retrieved to identify the PTE 220 in the page table register 230 for each thread of the process. Upon identification of the PTE 220, the protection key 218 associated with the identified PTE 220 is identified. As discussed above, the protection key 218 identifies a particular permission stored in the protection key register 228. In one implementation, the IOMMU 212 sends a signal to the one or more cores 210 identifying the protection key 218 and the PASID 262 for the thread of the process. The cores 210 generates a command 260 including the identified protection key 218 and sends the command 260 to the protection key register 228 in the IO device 250. In one example, the command 260 is an ultra-path interconnect command.

As discussed above, the protection key register 228 may include logic to determine whether the IO device 250 has permission to access the page in the memory 204 in order to store data associated with a process or the one or more threads of the process identified in the PASID 262. Specifically, the protection key register 228 determines whether the one or more threads of the process in the PASID 262 whose identifier is stored in the page table entry 220 has permission to access the one or more memory frames. In one implementation, a value of the protection key 218 assigned to the page table entry 220 is checked. As discussed above, the value indicated by the bits of the protection key 218 in the page table entry 220 is used to determine whether the one or more threads of a process are allowed access to the page residing in the memory domain. Accordingly, based on the value assigned to the protection key 218, the protection key register 228 allows or denies access to the memory page in the page table entry 220 for storage of data associated with the process or one of the one or more threads of the process identified in the PASID 262.

In one implementation, when the protection key register 228 determines that the one or more threads of the process have permission to access the page, the protection key register 228 allows access to the memory page to store the data associated with the process or the one or more threads of the process. In one implementation, upon storage of the data in the memory page, one or more threads of the process are executed by the processing core 210 using the stored data. In one implementation, when the protection key register 228 determines that the one or more threads do not have permission to access the memory frame, the protection key register 228 denies access to the memory page to store the data associated with the process or the one or more threads of the process. In one implementation, the protection key register 228 generates a memory fault signal upon determining that the one or more threads do not have permission to access the memory page. The memory fault signal may include the PASID 262 identifying a memory address of the memory page, which was denied access for storage of the data. The memory fault signal may include the PASID 262 identifying the process or the thread of the process, which failed upon denial of permission to access the memory page.

Figure 3:
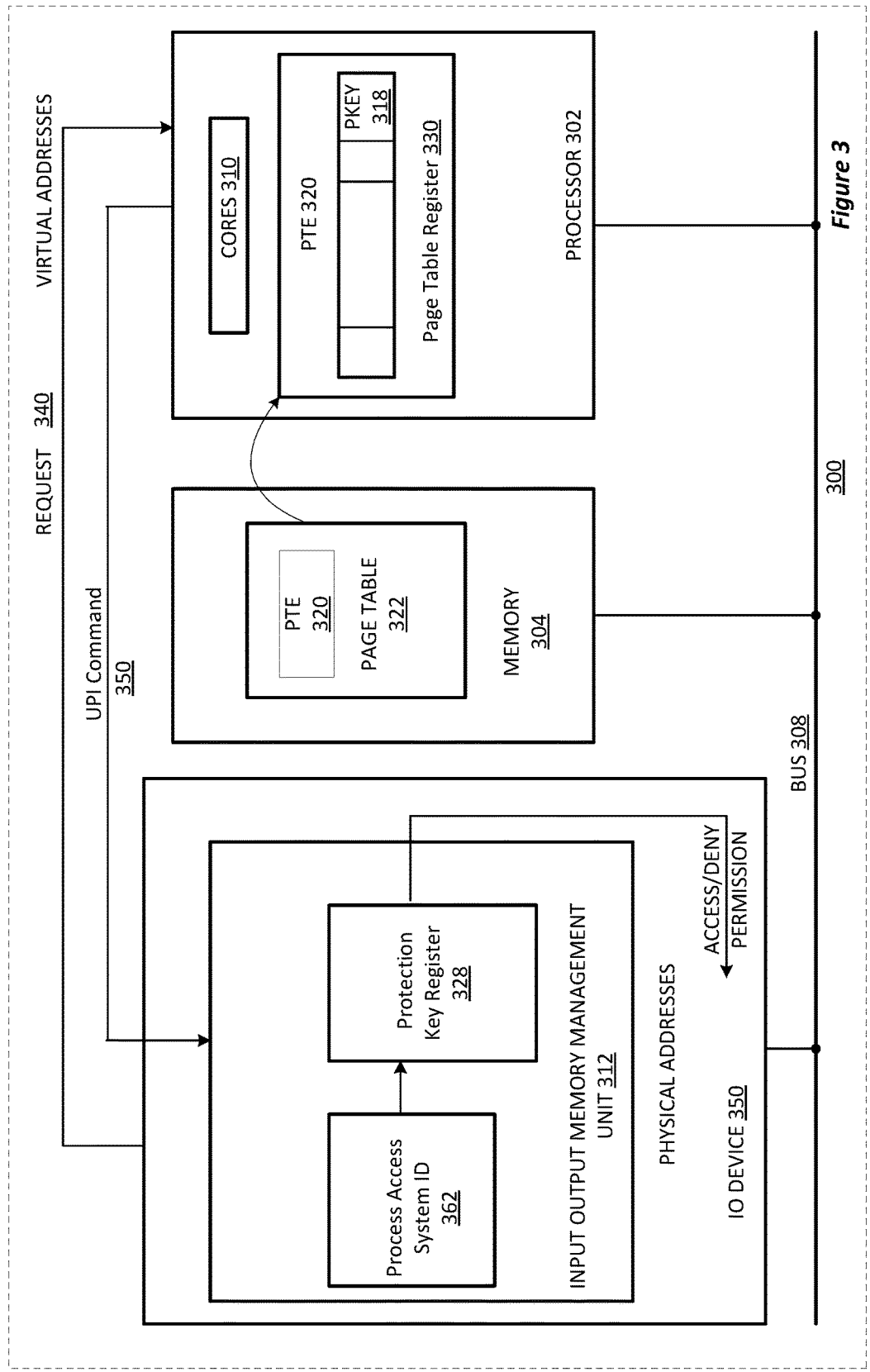
FIG. 3 illustrates a system on chip (SoC) including a processing system for memory protection at a thread level according to a further implementation of the present disclosure.

FIG. 3 illustrates a system-on-a-chip (SoC) 300 including a processing system to protect the memory according to an implementation of the disclosure. The SoC 300 may include a processor (such as a CPU) 302, a memory 304, and an IO device 350 that are communicably coupled to each other via a bus system 308. In one implementation, the processor 302 is same as the processor 102 of FIG. 1, the memory 304 is same as the memory 104 of FIG. 1, and the IO device 350 is same as the IO device 150 of FIG. 1. In one implementation, the processor 302 may further include one or more processing cores 310 (which may be the same as processing cores 110 of FIG. 1). In one implementation, the device 350 may include an IOMMU 312 (which may be the same as the IOMMU 112 of FIG. 1). In one implementation, the memory 304 may include a virtual address page table 322 (which may be the same as the virtual address page table 122 of FIG. 1) for storing mappings between pages of virtual addresses to physical addresses.

In one implementation, the virtual address page table 322 may include a plurality of page table entries 320, each of which may be the same as the page table entry 120 of FIG. 1. In one implementation, a page table entry 320 of the virtual address page table 322 may be loaded into a page table register 330 (which may be the same as the page table register 130 of FIG. 1) in order for the processor 302 to perform the memory address mapping. In one implementation, the page table entry 320 may further include a protection key section 318 to store a protection key selected by the operation system for the page table entry 320. In one implementation, the protection key section 318 is same as the protection key 118 of FIG. 1. As discussed above, a protection key is a string of binary bits (e.g., 4 bits) that may be used to indicate a set of memory access permissions stored in one or more permission registers.

In one implementation, the IOMMU 312 includes a protection key register 328. The protection key register 328 may be the same as the protection key register 128 of FIG. 1. In one implementation, the IOMMU 312 includes a PASID 362 corresponding to the IO device 350. The PASID 362 may be the same as the PASID 162 of FIG. 1. As discussed above, the PASID 362 identifies an address/page corresponding to the region in the memory 304 that is accessed in order to store data associated with a process or one or more threads of the process. The PASID 362 is unique to a memory page residing in a memory domain. Specifically, the PASID 362 defines the PTE 320 in the page table register 330 for a thread of the process. In one implementation, the PTE 320 in the page table register 330 is identified based on a memory page provided by the process in the PASID 362.

In one implementation, the processor 302 receives a request 340 from the IO device 350 to store data associated with a process or one or more threads of the process by utilizing a page/address in the memory 304 identified by the PASID 362. In one implementation, upon receipt of the request 340, the page in the corresponding PASID 362 is retrieved to identify the PTE 320 in the page table register 330 for each thread of the process. Upon identification of a PTE, the protection key 318 associated with the PTE is identified. As discussed above, the protection key 318 identifies a particular access permission stored in the protection key register 328. In one implementation, the core 310 generates a command 360 including the identified protection key 318 and sends the command 360 to the IOMMU 312 in the IO device 350. In one example, the command 360 is an ultra-path interconnect command.

As discussed above, the protection key register 328 in the IOMMU 312 may include logic to determine whether the IO device 350 has permission to access the page in the memory 304 in order to store data associated with a process or the one or more threads of the process identified in the PASID 362.

Specifically, the protection key register 328 determines whether the one or more threads of the process in the PASID 362 whose identifier is stored in the page table entry 320 has permission to access the one or more memory frames. In one implementation, a value of the protection key 318 assigned to the page table entry 320 is checked. As discussed above, the value indicated by the bits of the protection key 318 in the page table entry 320 is used to determine whether the one or more threads of a process are allowed access to the page residing in the memory domain. Accordingly, based on the value assigned to the protection key 318, the protection key register 328 allows or denies access to the memory page in the page table entry 320 for storage of data associated with a process or the one or more threads of the process identified in the PASID 362.

In one implementation, when the protection key register 328 determines that the one or more threads of the process have permission to access the page, the protection key register 328 allows access to the memory page to store the data associated with the process or the one or more threads of the process. In one implementation, upon storage of the data in the memory page, one or more threads of the process are executed by the processing core 310 using the stored data. In one implementation, when the protection key register 328 determines that the one or more threads do not have permission to access the memory frame, the protection key register 328 denies access to the memory page to store the data associated with the process or the one or more threads of the process. In one implementation, the protection key register 328 generates a memory fault signal upon determining that the one or more threads do not have permission to access the memory page. The memory fault signal may include the PASID 362 identifying a memory address of the memory page, which was denied access for storage of the data. The memory fault signal may include the PASID 362 identifying the process or the thread of the process, which failed upon denial of permission to access the memory page.

FIG. 4 is a flow diagram of a method of providing memory protection at a thread level for a memory protection key architecture provided by an IOMMU according to an implementation of the present disclosure. Method 400 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one implementation, method 400 may be performed, in part, by processing logic of any one of processing cores 110 executing an operating system with respect to FIGS. 1, 2 and 3.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at block 402, a request including a PASID is generated by an IO device. The request is to store data associated with a process or one or more threads of a process using a memory page in the memory, where the memory page is identified by the PASID. The PASID is a process tag associated with the process, where the PASID defines a memory page corresponding to a region in the memory that is accessed in order to store the data associated with a process or the one or more threads of the process. Specifically, the PASID defines a PTE in a page table register for each of the threads of the process. At block 404, processing logic identifies a protection key associated with the memory page in the memory defined in the PASID. In one implementation, the IOMMU performing the protection key identification may be located in the processor or in the IO device. Specifically, the protection key is stored for the PTE at the time of the PTE's creation. The protection key identifies a particular permission stored in a protection key register for the page. In one implementation, a command including the identified protection key is generated by a processing core.

At block 406, processing logic determines a value assigned to the identified protection key. In one implementation, the value of the protection key is determined to ascertain whether the thread of the process is allowed to access the page. In one implementation, a protection key register is utilized to determine the value assigned to the protection key. In some implementations, the protection key register is located in the IO device or in the IOMMU located in the processor. At block 408, it is determined whether the value indicates access permission to the memory page. When, at block 408, it is determined that the value indicates access permission to the memory page, then at block 410, the thread of the process is allowed access to the memory page to store the data. At block 412, the thread of the process is executed using the stored data in the memory page. When at block 418, it is determined that the value does not indicate access permission to the memory page, then at block 414, the thread of the process is denied access to the memory page to store the data. Subsequently, at block 416, the processing logic generates a memory fault signal. As discussed above, the memory fault signal may include the PASID identifying a memory address of the memory page denied access for storage of the data. Also as discussed above, the memory fault signal may include the PASID identifying the process or the thread of the process, which failed upon denial of permission to access the memory page.

Figure 5A:
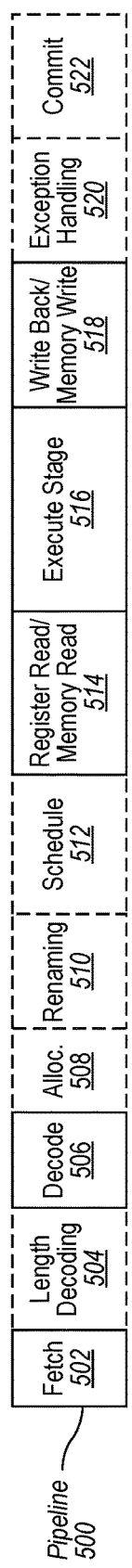
FIG. 5A is a block diagram illustrating a micro-architecture for a processor in which one implementation of the disclosure may be used.

FIG. 5A is a block diagram illustrating an in-order pipeline and a register renaming stage, out-of-order issue/execution pipeline implemented by processing device 500 according to some implementations of the disclosure. The solid lined boxes in FIG. 5A illustrate an in-order pipeline, while the dashed lined boxes illustrates a register renaming, out-of-order issue/execution pipeline. In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some implementations, the ordering of stages 502-524 may be different than illustrated and are not limited to the specific ordering shown in FIG. 5A.

Figure 5B:
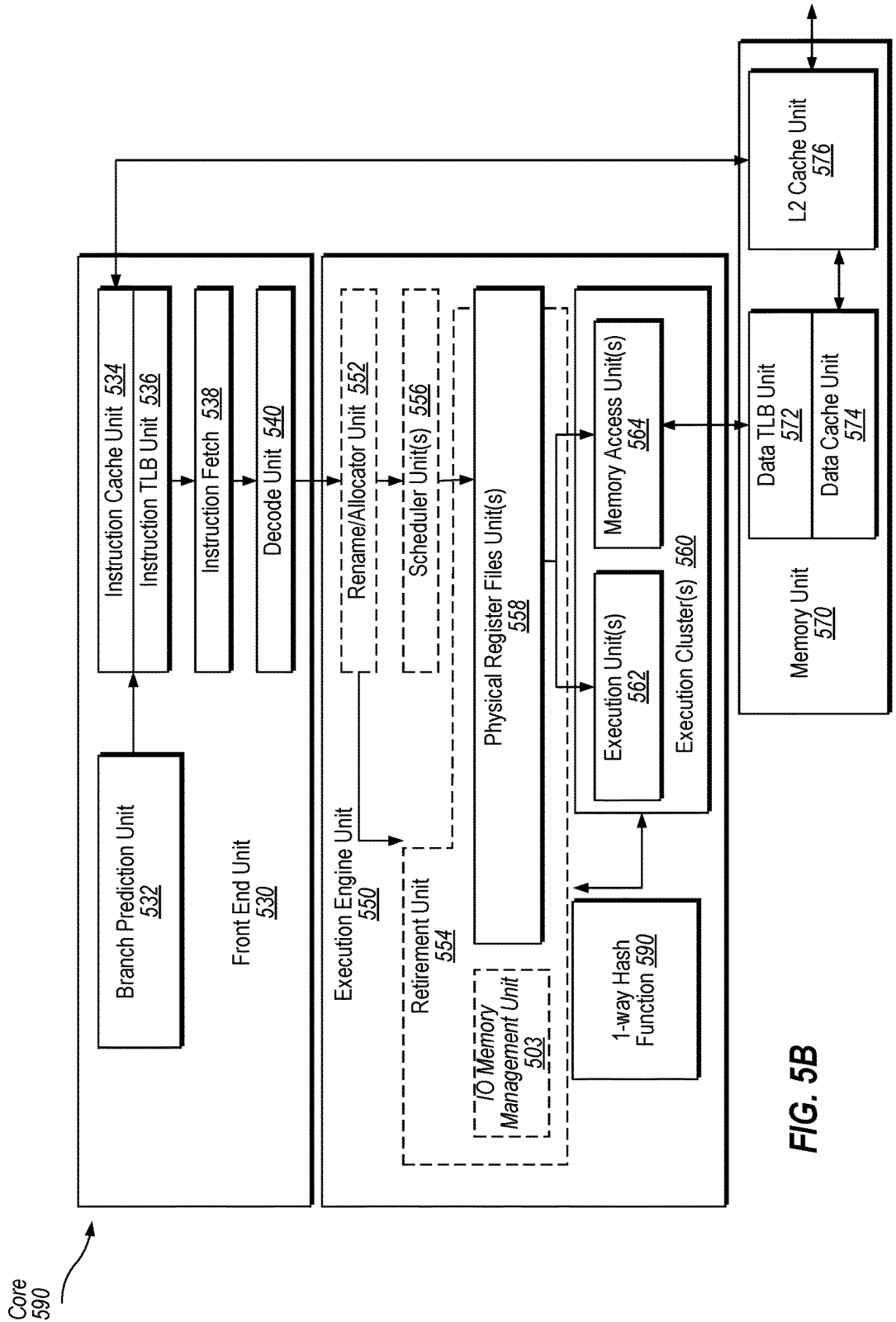
FIG. 5B is a block diagram illustrating an in-order pipeline and a register renaming stage, out-of-order issue/execution pipeline implemented according to at least one implementation of the disclosure.

FIG. 5B is a block diagram illustrating a micro-architecture for a processor 500 that implements the processing device including heterogeneous cores in accordance with one implementation of the disclosure. Specifically, processor 500 depicts an in-order architecture core and a register renaming logic, out-of-order issue/execution logic to be included in a processor according to at least one implementation of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one implementation, processor 500 may be a multi-core processor or may part of a multiprocessor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The retirement unit 554 may include an input output memory management unit 503 to access control for a memory protection key architecture according to implementations of the invention. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 556, physical register file(s) unit(s) 558, and execution cluster(s) 560 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some implementations DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary implementation, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one implementation, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 6:
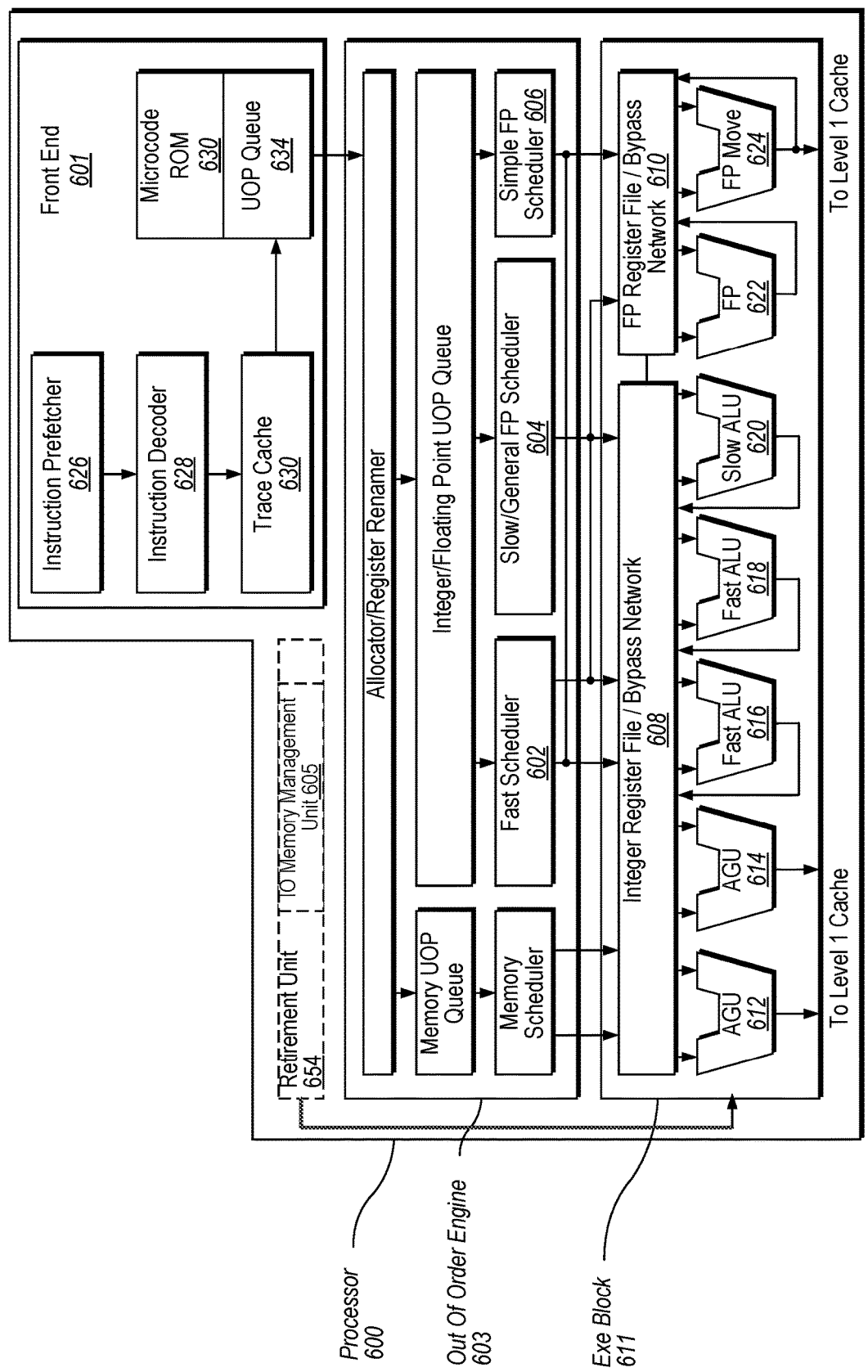
FIG. 6 illustrates a block diagram of the micro-architecture for a processor in accordance with one implementation of the disclosure.

FIG. 6 illustrates a block diagram of the micro-architecture for a processor 600 that includes hybrid cores in accordance with one implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 601 is the part of the processor 600 that fetches instructions to be executed and prepares them to be used later in the processor pipeline.

The front end 601 may include several units. In one implementation, the instruction prefetcher 626 fetches instructions from memory and feeds them to an instruction decoder 628 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one implementation, if more than four micro-ops are needed to complete an instruction, the decoder 628 accesses the microcode ROM 632 to do the instruction. For one implementation, an instruction can be decoded into a small number of micro ops for processing at the instruction decoder 628. In another implementation, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one implementation from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one implementation can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one implementation also includes a bypass network that can bypass or forward just completed results that have not yet been written into the register file to new dependent uops. The integer register file 608 and the floating point register file 610 are also capable of communicating data with the other. For one implementation, the integer register file 608 is split into two separate register files, one register file for the low order 32 bits of data and a second register file for the high order 32 bits of data. The floating point register file 610 of one implementation has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one implementation is comprised of a number of execution units: address generation unit (AGU) 612, AGU 614, fast ALU 616, fast ALU 618, slow ALU 620, floating point ALU 622, floating point move unit 624. For one implementation, the floating point execution blocks 622, 624, execute floating point, MMX, SIMD, and SSE, or other operations. The floating point ALU 622 of one implementation includes a 64 bit by 64 bit floating point divider to execute divide, square root, and remainder micro-ops. For implementations of the present disclosure, instructions involving a floating point value may be handled with the floating point hardware.

In one implementation, the ALU operations go to the high-speed ALU execution units 616, 618. The fast ALUs 616, 618, of one implementation can execute fast operations with an effective latency of half a clock cycle. For one implementation, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one implementation, the integer ALUs 616, 618, 620, are described in the context of performing integer operations on 64 bit data operands. In alternative implementations, the ALUs 616, 618, 620, can be implemented to support a variety of data bits including 16, 32, 128, 256, etc. Similarly, the floating point units 622, 624, can be implemented to support a range of operands having bits of various widths. For one implementation, the floating point units 622, 624, can operate on 128 bits wide packed data operands in conjunction with SIMD and multimedia instructions.

In one implementation, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The processor 600 also includes logic to implement store address prediction for memory disambiguation according to implementations of the disclosure. In one implementation, the execution block 611 of processor 600 may include a store address predictor (not shown) for implementing store address prediction for memory disambiguation.

The processor 600 may include a retirement unit 654 coupled to the execution block 611. The retirement unit 654 may include a input output memory management unit 605 to access control for a memory protection key architecture according to implementations of the invention.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 7:
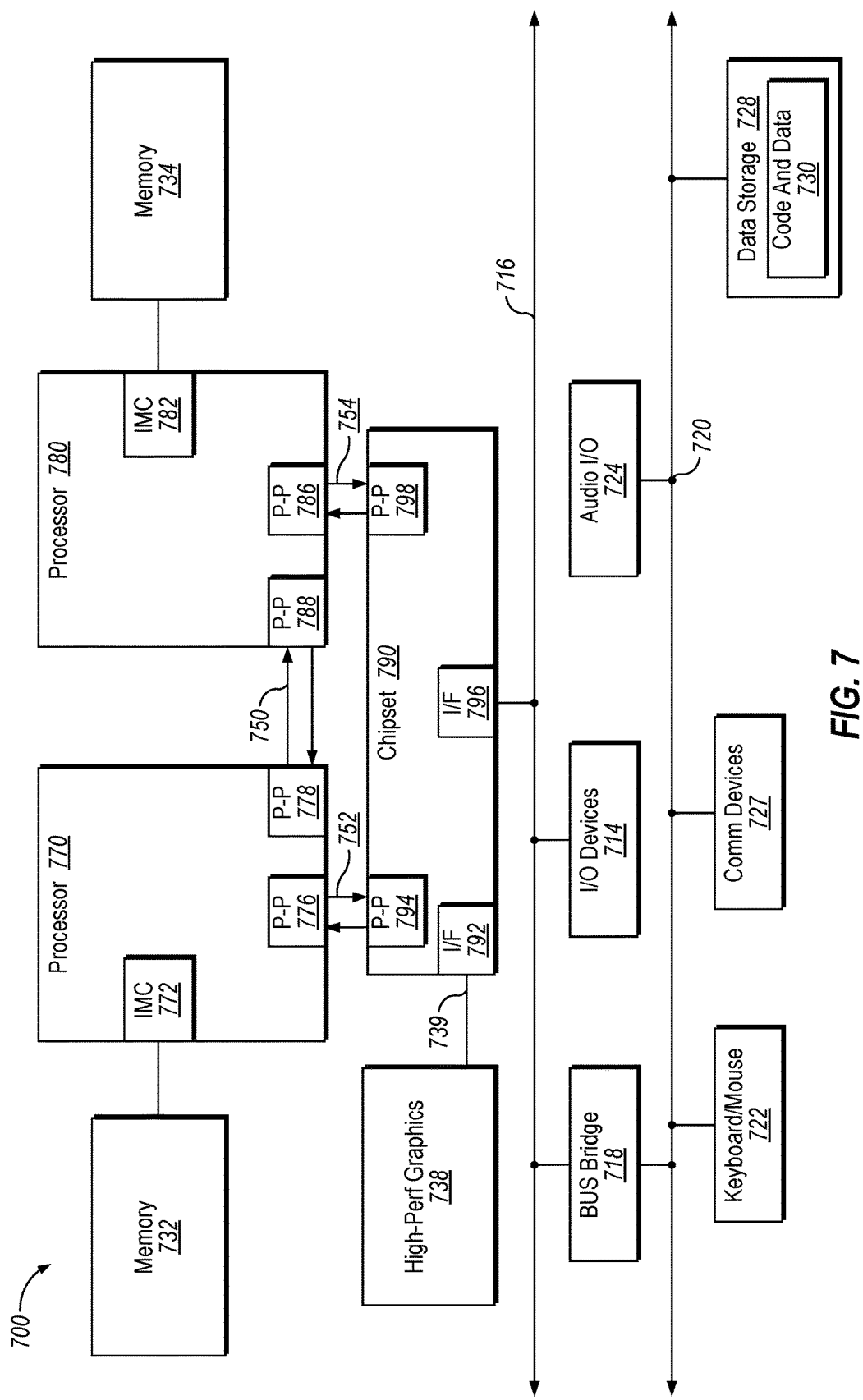
FIG. 7 is a block diagram illustrating a system in which an implementation of the disclosure may be used.

Referring now to FIG. 7, shown is a block diagram illustrating a system 700 in which an implementation of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of implementations of the disclosure is not so limited. In other implementations, one or more additional processors may be present in a given processor. In one implementation, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one implementation, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one implementation, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one implementation. Further, an audio I/O 724 may be coupled to second bus 720. Note that other architectures are possible. For example, instead of the point-to-point architecture of FIG. 7, a system may implement a multi-drop bus or other such architecture.

Figure 8:
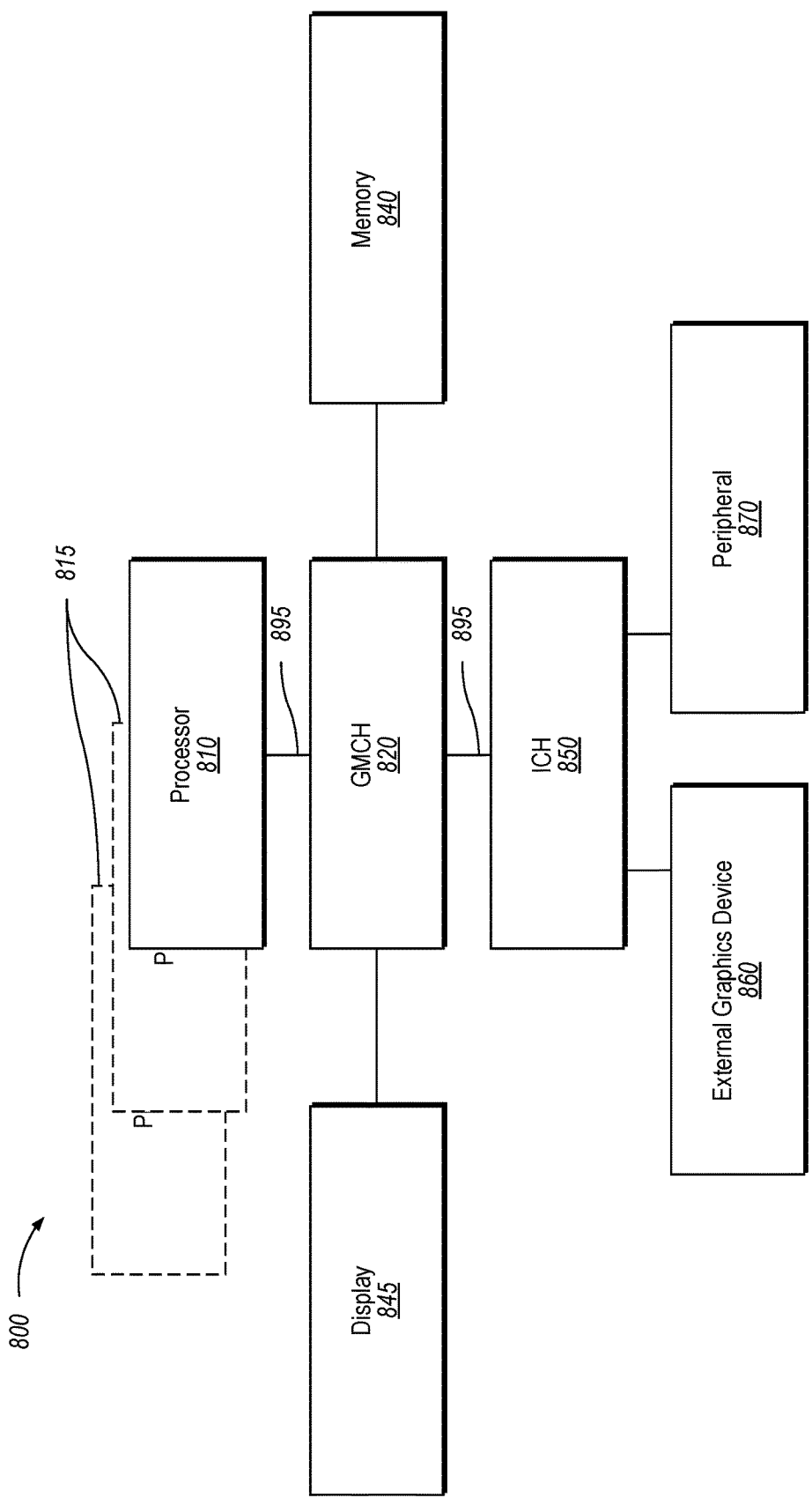
FIG. 8 is a block diagram of a system in which an implementation of the disclosure may operate.

Referring now to FIG. 8, shown is a block diagram of a system 800 in which one implementation of the disclosure may operate. The system 800 may include one or more processors 810, 815, which are coupled to graphics memory controller hub (GMCH) 820. The optional nature of additional processors 815 is denoted in FIG. 8 with broken lines. In one implementation, processors 810, 815 implement hybrid cores according to implementations of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one implementation, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800.

For at least one implementation, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the implementation of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one implementation, the various processors 810, 815 may reside in the same die package.

Figure 9:
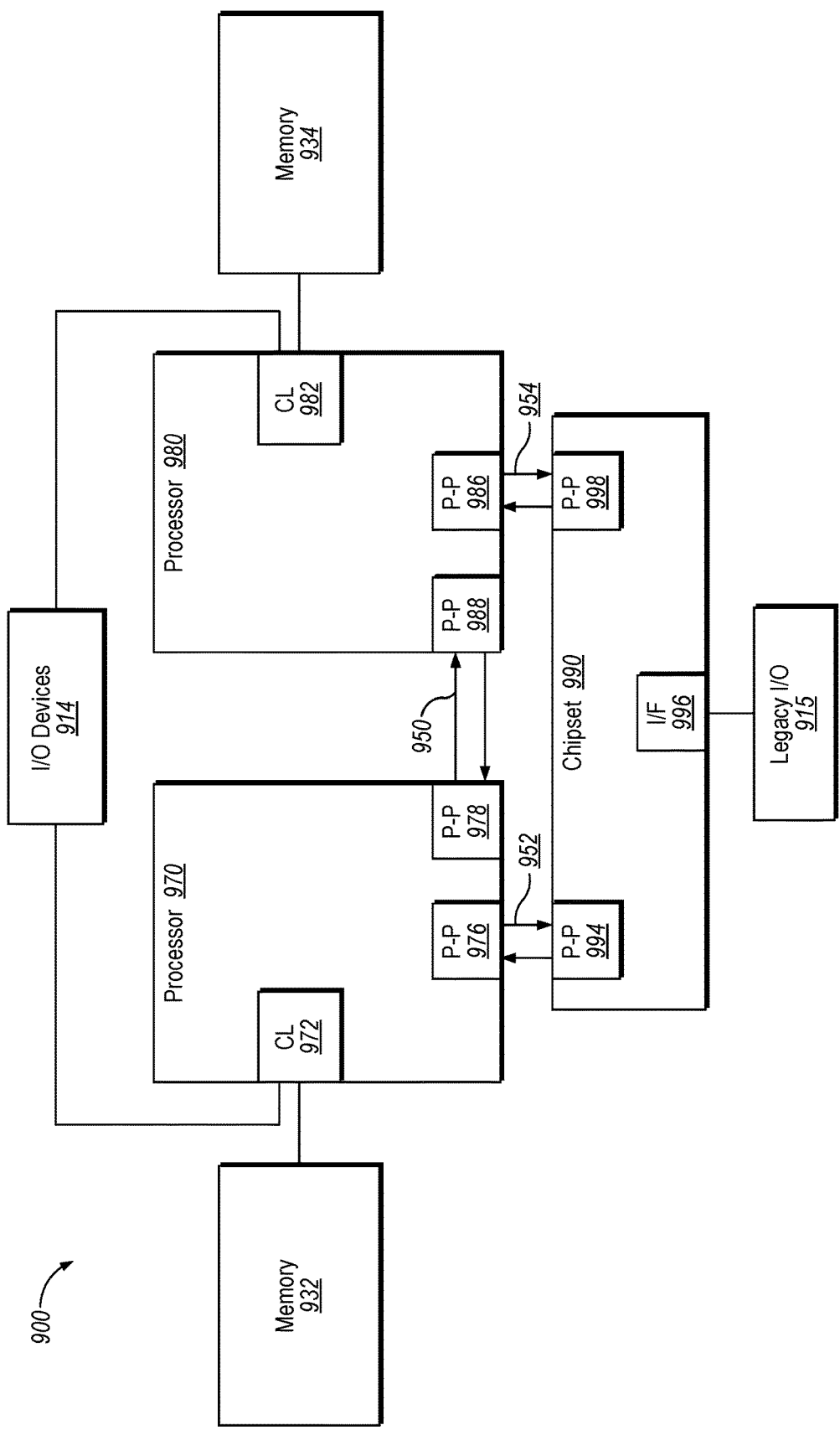
FIG. 9 is a block diagram of a system in which an implementation of the disclosure may operate.

Referring now to FIG. 9, shown is a block diagram of a system 900 in which an implementation of the disclosure may operate. FIG. 9 illustrates processors 970, 980. In one implementation, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one implementation, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
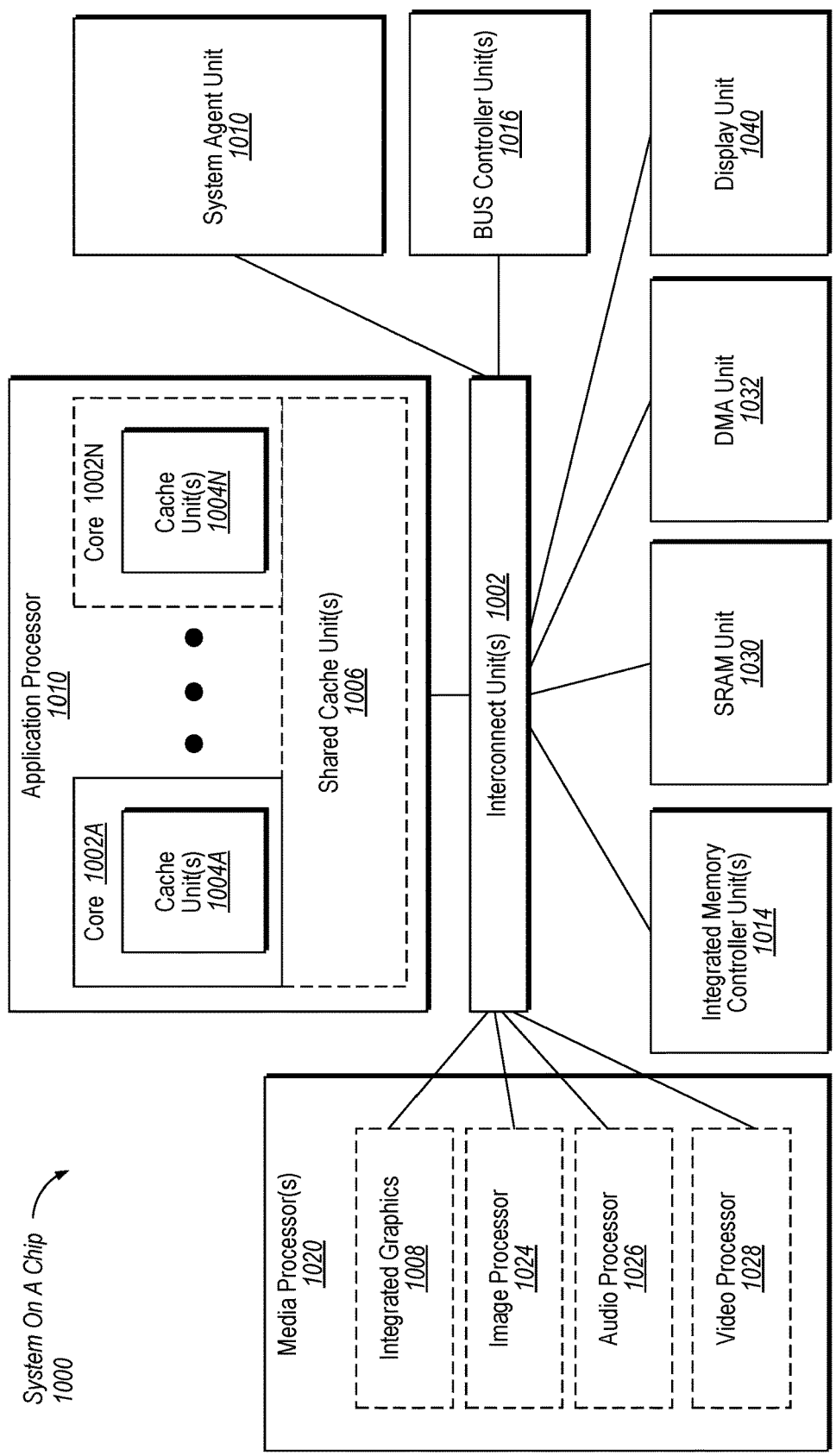
FIG. 10 is a block diagram of a System-on-a-Chip (SoC) in accordance with an implementation of the present disclosure

Implementations may be implemented in many different system types. FIG. 10 is a block diagram of a SoC 1000 in accordance with an implementation of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one implementation, a memory module may be included in the integrated memory controller unit(s) 1014. In another implementation, the memory module may be included in one or more other components of the SoC 1000 that may be used to access and/or control a memory.

The application processor 1020 may include a store address predictor for implementing hybrid cores as described in implementations herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some implementations, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
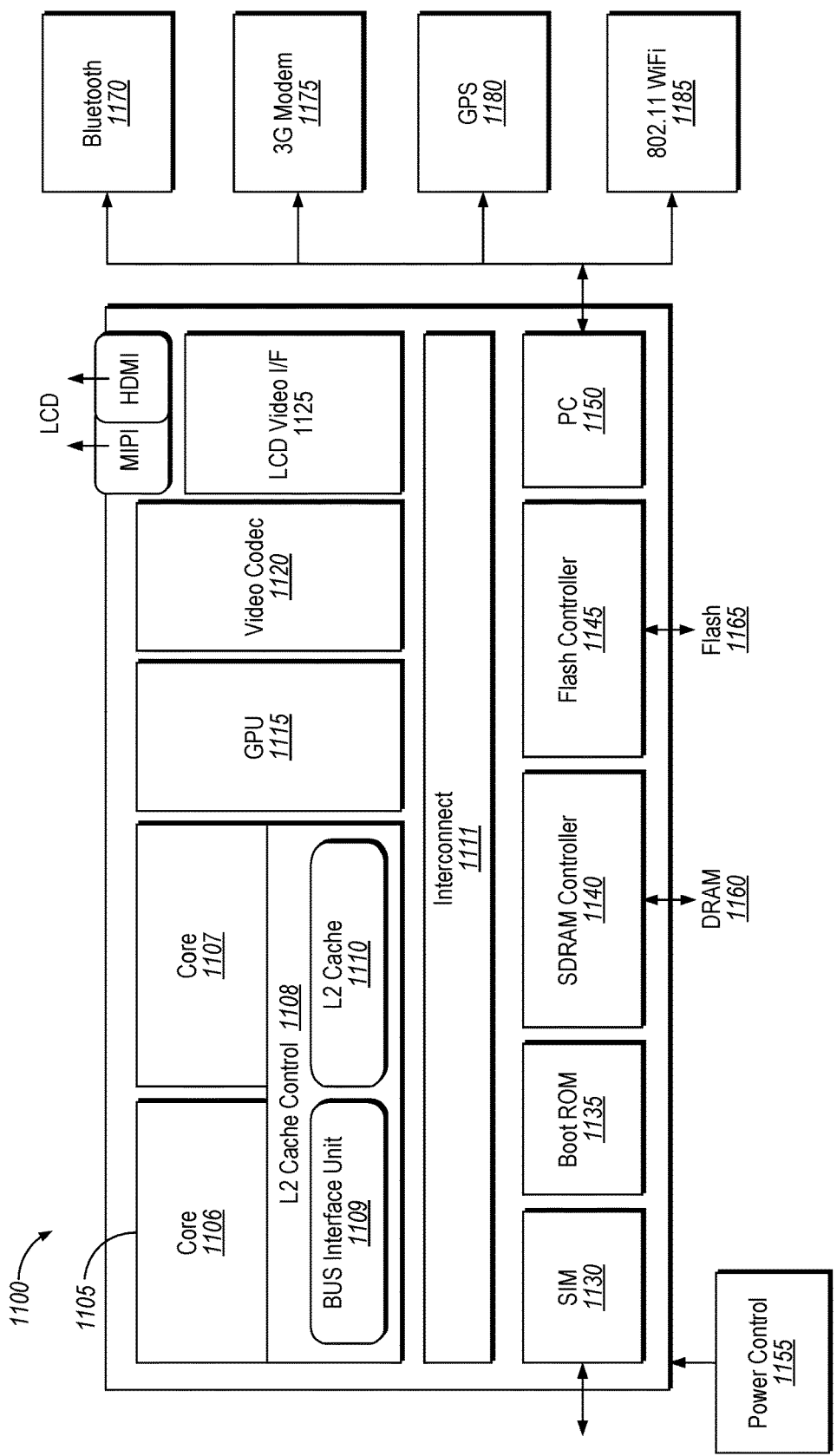
FIG. 11 is a block diagram of an implementation of an SoC design in accordance with the present disclosure.

FIG. 11 is a block diagram of an implementation of a system on-chip (SoC) design in accordance with the present disclosure. As a specific illustrative example, SoC 1100 is included in user equipment (UE). In one implementation, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one implementation, cores 1106, 1107 may implement hybrid cores as described in implementations herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
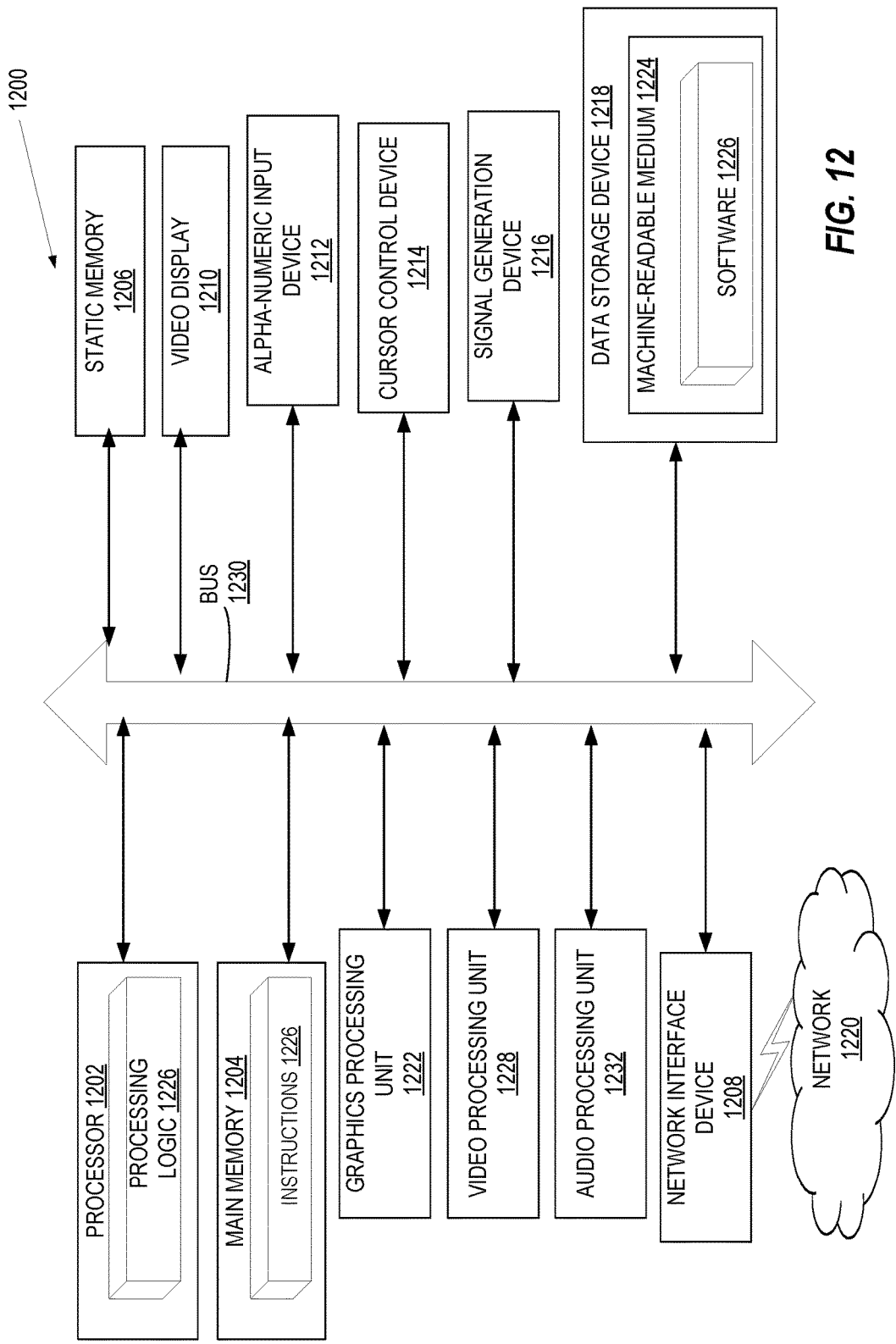
FIG. 12 illustrates a block diagram of one implementation of a computer system.

FIG. 12 illustrates a diagrammatic representation of a machine in the example form of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one implementation, processing device 1202 may include one or processing cores. The processing device 1202 is configured to execute the processing logic 1226 for performing the operations and steps discussed herein. In one implementation, processing device 1202 is the same as processor architecture 100 described with respect to FIG. 1 as described herein with implementations of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to implementations of the disclosure. While the machine-accessible storage medium 1128 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further implementations.

Example 1 is a processing device comprising a processing core to execute a thread of a process and an input output (IO) memory management unit communicably coupled to the processing core, wherein the IO memory management unit comprising a storage unit to store a page table entry comprising an identifier of a memory domain and a protection key associated with the identifier, the protection key indicating whether a memory page in the memory domain is accessible; and a protection key register comprising a field indexed by the protection key, the field comprising a set of bits reflecting a memory access permission associated with the protection key, wherein the protection key register is, responsive to receiving a request from an IO device to store data associated with a process or a thread of the process, to one of allow or deny permission to access the memory page in the memory domain for storage of the data associated with the process or the thread of the process based on the protection key.

In Example 2, the subject matter of Example 1 can optionally include wherein the storage unit stores a plurality of other page table entries, and wherein each of the other page table entries comprises another identifier of another memory domain and another protection key associated with the another identifier.

In Example 3, the subject matter of Examples 1-2 can optionally include wherein the protection key register comprises a plurality of fields, wherein each of the plurality of fields is indexed by one of the protection keys associated with the memory access permission.

In Example 4, the subject matter of Examples 1-3 can optionally include wherein the process comprises a plurality of threads.

In Example 5, the subject matter of Examples 1-4 can optionally include wherein the request comprises a process access system identification (PASID) associated with the thread, the PASID identifying the memory page residing in the memory domain to access for storage of the data associated with the process or the thread of the process.

In Example 6, the subject matter of Examples 1-5 can optionally include wherein a value is assigned to the protection key.

In Example 7, the subject matter of Examples 1-6 can optionally include wherein the value is assigned based on a policy set by one of an operating system or an application.

In Example 8, the subject matter of Examples 1-7 can optionally include wherein the protection key register is to one of allow or deny access to the memory page in the memory domain to store the data associated with the process or the thread of the process based on the value assigned to the protection key.

In Example 9, the subject matter of Examples 1-8 can optionally include wherein the protection key register to generate a memory fault signal in response to the deny access to the memory page in the memory domain, wherein the memory fault signal comprise the PASID identifying a memory address associated with the memory page and the process or the thread of the process.

Example 10 is a system-on-a chip (SoC) comprising a memory; and a processor, communicatively coupled to the memory, comprising a processing core to execute a thread of the process and an input output (IO) memory management unit comprising a storage unit to store a page table entry comprising an identifier of a memory domain and a protection key associated with the identifier, the protection key indicating whether a memory page in the memory domain is accessible; and an input output (IO) device comprising a protection key register comprising a field indexed by the protection key, the field comprising a set of bits reflecting a memory access permission associated with the protection key, wherein the protection key register is, responsive to receiving a request from an IO device to store data associated with a process or the thread of the process, to one of allow or deny permission to access the memory page in the memory domain for storage of the data associated with the process or the thread of the process based on the protection key.

In Example 11, the subject matter of Example 10 can optionally include wherein the request comprise a process access system identification (PASID) associated with the thread, the PASID identifying the memory page residing in the memory domain to access for storage of the data associated with the process or the thread of the process.

In Example 12, the subject matter of Examples 10-11 can optionally include wherein the processing core to generate a command sending the protection key to the protection key register in the IO device.

In Example 13, the subject matter of Examples 10-12 can optionally include wherein a value is assigned to the protection key.

In Example 14, the subject matter of Examples 10-13 can optionally include wherein the protection key register to one of allow or deny access to the memory page in the memory domain to store the data associated with the process or the thread of the process based on the value.

In Example 15, the subject matter of Examples 10-14 can optionally include wherein the protection key register to generate a memory fault signal in response to the deny access to the memory page in the memory domain, wherein the memory fault signal comprise the PASID identifying a memory address associated with the memory page and the process or the thread of the process.

Example 16 is a system comprising a memory and a processor, communicatively coupled to the memory, comprising a processing core to execute a thread of a process and a storage unit to store a page table entry comprising an identifier of a memory domain and a protection key associated with the identifier indicating whether a memory page in the memory domain is accessible; and an input output (IO) device comprising an IO memory management unit comprising a protection key register comprising a field indexed by the protection key, the field comprising a set of bits reflecting a memory access permission associated with the protection key, wherein the protection key register is, responsive to receiving a request from an IO device to store data associated with a process or a thread of the process, to one of allow or deny permission to access the memory page in the memory domain for storage of the data associated with the process or the thread of the process based on the protection key.

In Example 17, the subject matter of Example 16 can optionally include wherein the request comprise a process access system identification (PASID) associated with the thread, the PASID identifying the memory page residing in the memory domain to access for storage of the data associated with a process or the thread of the process.

In Example 18, the subject matter of Examples 16-17 can optionally include wherein the processing core to generate a command sending the protection key to the IO memory management unit.

In Example 19, the subject matter of Examples 16-18 wherein a value is assigned to the protection key.

In Example 20, the subject matter of Examples 16-19, wherein the protection key register to one of allow or deny access to the memory page in the memory domain to store the data associated with the process or the thread of the process based on the value.

Example 21 is a method comprising receiving a request from an IO device to access a memory page in a memory domain to store data associated with a process or a thread of a process, identifying a protection key associated with an identifier of the memory domain, wherein the protection key indicates whether the memory page in the memory domain is accessible; and generating one of allow or deny permission to access the memory page in the memory domain for storage of the data associated with the process or the thread of the process based on the identified protection key.

In Example 22, the subject matter of Example 21, wherein the request comprise a process access system identification (PASID) associated with the thread, the PASID identifying the memory page residing in the memory domain for storage of the data associated with the process or the thread of the process.

In Example 23, the subject matter of Examples 21-22, wherein a value is assigned to the identified protection key.

In Example 24, the subject matter of Example 21-23 wherein generating the one of allow or deny access to the memory page in the memory domain for storage of the data associated with the process or the thread of the process is based on the value.

In Example 25, the subject matter of Examples 21-24 further comprising generating a memory fault signal in response to the deny access to the memory page in the memory domain, wherein the memory fault signal comprise the PASID identifying a memory address associated with the memory page and the process or the thread of the process.

While the disclosure has been described with respect to a limited number of implementations, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example, the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices;

optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the present disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. A processing device comprising:
   a processing core to execute a thread of a process; and
   an input output (IO) memory management unit (IOMMU) communicably coupled to the processing core, wherein the IOMMU comprising:
      a storage unit to store a page table entry comprising an identifier of a memory domain and a protection key associated with the identifier, the protection key indicating whether a memory page in the memory domain is accessible, wherein the page table entry to translate a virtual address to a physical address;
      a protection key register comprising a field indexed by the protection key, the field comprising a set of bits reflecting a memory access permission associated with the protection key, wherein the protection key register is, responsive to receiving a request from an IO device to store data associated with a process or a thread of the process, to one of allow or deny permission to access the memory page in the memory domain for storage of the data based on the memory access permission associated with the protection key in the page table entry; and
      a process access system identification (PASID) register comprising a plurality of PASIDs corresponding to input/output (I/O) devices coupled to the processing core and IOMMU, wherein each of the PASIDs to identify a corresponding memory page residing in a corresponding memory domain to access for storage of data associated with a corresponding process or a corresponding thread of the corresponding process.

2. The processing device of claim 1, wherein the storage unit stores a plurality of other page table entries, and wherein each of the other page table entries comprises another identifier of another memory domain and another protection key associated with the another identifier.

3. The processing device of claim 2, wherein the protection key register comprises a plurality of fields, wherein each of the plurality of fields is indexed by one of the protection keys associated with the memory access permission.

4. The processing device of claim 1, wherein the process comprises a plurality of threads.

5. The processing device of claim 1, wherein the request comprises a PASID associated with the thread, and wherein the IOMMU references the PASID register with the PASID.

6. The processing device of claim 5 wherein the value is assigned based on a policy set by one of an operating system or an application.

7. The processing device of claim 6, wherein the protection key register is to one of allow or deny access to the memory page in the memory domain to store the data associated with the process or the thread of the process based on the value assigned to the protection key.

8. The processing device of claim 7 wherein the protection key register to generate a memory fault signal in response to the deny access to the memory page in the memory domain, wherein the memory fault signal comprise the PASID identifying a memory address associated with the memory page and the process or the thread of the process.

9. The processing device of claim 1, wherein a value is assigned to the protection key.

10. A system-on-a chip (SoC) comprising:
    a memory; and
    a processor, communicatively coupled to the memory, comprising a processing core to execute a thread of the process and an input output (TO) memory management unit (IOMMU) comprising a storage unit to store a page table entry comprising an identifier of a memory domain and a protection key associated with the identifier, the protection key indicating whether a memory page in the memory domain is accessible, wherein the page table entry to translate a virtual address to a physical address; and
    an input output (TO) device comprising:
      a protection key register comprising a field indexed by the protection key, the field comprising a set of bits reflecting a memory access permission associated with the protection key, wherein the protection key register is, responsive to receiving a request from an IO device to store data associated with a process or the thread of the process, to one of allow or deny permission to access the memory page in the memory domain for storage of the data associated with the process or the thread of the process based on the protection key; and
a process access system identification (PASID) register comprising a plurality of PASIDs corresponding to input/output (I/O) devices coupled to the processing core and IOMMU, wherein each of the PASIDs to identify a corresponding memory page residing in a corresponding memory domain to access for storage of data associated with a corresponding process or a corresponding thread of the corresponding process.

11. The SoC of claim 10, wherein the request comprises a PASID associated with the thread, and wherein the IOMMU references the PASID register with the PASID.

12. The SoC of claim 11, wherein a value is assigned to the protection key.

13. The SoC of claim 12, wherein the protection key register to one of allow or deny access to the memory page in the memory domain to store the data associated with the process or the thread of the process based on the value.

14. The SoC of claim 13 wherein the protection key register to generate a memory fault signal in response to the deny access to the memory page in the memory domain, wherein the memory fault signal comprise the PASID identifying a memory address associated with the memory page and the process or the thread of the process.

15. The SoC of claim 10, wherein the processing core to generate a command sending the protection key to the protection key register in the IO device.

16. A system comprising:
a memory; and
a processor, communicatively coupled to the memory, comprising a processing core to execute a thread of a process and a storage unit to store a page table entry comprising an identifier of a memory domain and a protection key associated with the identifier indicating whether a memory page in the memory domain is accessible, wherein the page table entry to translate a virtual address to a physical address; and
an input output (TO) device comprising an IO memory management unit comprising:
a protection key register comprising a field indexed by the protection key, the field comprising a set of bits reflecting a memory access permission associated with the protection key, wherein the protection key register is, responsive to receiving a request from an IO device to store data associated with a process or a thread of the process, to one of allow or deny permission to access the memory page in the memory domain for storage of the data associated with the process or the thread of the process based on the protection key; and
a process access system identification (PASID) register comprising a plurality of PASIDs corresponding to input/output (I/O) devices coupled to the processing core and IOMMU, wherein each of the PASIDs to identify a corresponding memory page residing in a corresponding memory domain to access for storage of data associated with a corresponding process or a corresponding thread of the corresponding process.

17. The system of claim 16, wherein the request comprises a PASID associated with the thread, and wherein the IOMMU references the PASID register with the PASID.

18. The system of claim 16, wherein the processing core to generate a command sending the protection key to the IO memory management unit.

19. The system of claim 16, wherein a value is assigned to the protection key.

20. The system of claim 19, wherein the protection key register to one of allow or deny access to the memory page in the memory domain to store the data associated with the process or the thread of the process based on the value.

21. A method comprising:
receiving a request from an input/output (I/O) device to access a memory page in a memory domain to store data associated with a process or a thread of a process,
referencing a process access system identification (PASID) register with a PASID of the request to identify a page table entry corresponding to the process or the thread of the process, the PASID register comprising a plurality of PASIDs corresponding to input/output (I/O) devices comprising the I/O device, wherein each of the PASIDs to identify a corresponding memory page residing in a corresponding memory domain to access for storage of data associated with a corresponding process or a corresponding thread of the corresponding process;
identifying a protection key associated with an identifier of the memory domain, wherein the protection key indicates whether the memory page in the memory domain is accessible, and wherein the page table entry maintains an association between the protection key and the identifier of the memory domain, the page table entry to translate a virtual address to a physical address; and
generating one of allow or deny permission to access the memory page in the memory domain for storage of the data associated with the process or the thread of the process based on the identified protection key.

22. The method of claim 21, wherein a value is assigned to the identified protection key.

23. The method of claim 22, wherein generating the one of allow or deny access to the memory page in the memory domain for storage of the data associated with the process or the thread of the process is based on the value.

24. The method of claim 21 further comprising generating a memory fault signal in response to the deny access to the memory page in the memory domain, wherein the memory fault signal comprise the PASID identifying a memory address associated with the memory page and the process or the thread of the process.

\* \* \* \* \*